UNITED STATES PATENT OFFICE 1,964,725

SULPHIDE PLASTIC AND PROCESS OF MAKING SAME

Carleton Ellis, Montclair, N. J., assignor to Ellis-Foster Company, a corporation of New Jersey No Drawing. Application July 31, 1929,
Serial No. 382,597

10 Claims. (Cl. 260—6)

This invention relates to a plastic product obtained by reaction between polysulphides, and a mixture of aldehydes, particularly formaldehyde and acetaldehyde or substances of an equivalent character capable of forming a mixture of organic sulphides of an amorphous plastic nature.

The invention will be illustrated by the reaction of a mixture of formaldehyde and acetaldehyde with sodium polysulphide, but it is understood that any other suitable sulphiding agent may be employed. Preferably the reaction is carried out by simultaneously reacting on the two aldehydes or plurality of aldehydes with the sulphiding agent, but in certain cases I may react on the aldehydes successively or in any other desired way. There also exists the step of forming the plastic bodies separately by reacting on each aldehyde alone with the sulphiding agent and subsequently incorporating the product of these separately conducted reactions, employing if necessary heating to intermingle, blend or react the substances so prepared.

When acetaldehyde is treated with sodium hydroxide solution or other fixed alkali it tends to resinify to form what is called acetaldehyde resin or aldehyde resin. It is possible in connection with the procedure outlined in a general way above to produce more or less acetaldehyde resin but in the presence of a sulphiding agent, such as sodium polysulphide or calcium polysulphide, the reaction also may be caused to produce organic sulphide bodies to a very considerable extent. By co-reaction of the plurality of aldehydes I seek to obtain to a greater or lesser extent interreaction and production of amorphous plastic bodies ranging from hard or brittle plastics to those of a more rubbery and yielding nature.

While acetaldehyde is set forth as a typical aldehyde to employ with formaldehyde to produce the duplex organic sulphide, I may also, if desired, use other aldehydes such as propyl aldehyde, butyl aldehyde, furfural, benzaldehyde, cinnammic aldehyde and various other saturated and unsaturated aldehydes of the fatty or aliphatic series, the aromatic or cyclic series and the alicyclic series or heterocyclic series.

The reaction of a mixture of the lower aldehydes preferably is carried out in the presence of a considerable proportion of an alcoholic medium, such as methyl or ethyl alcohol ordinarily diluted with water. In the presence of an alcohol such as methanol in substantial proportion an acceleration of the reaction takes place when a reagent such as sodium polysulphide is employed. The alcohol not only has an accelerating or catalytic action, but appears also to orient or determine the course of the reaction, at least to a limited degree, and I therefore look upon the alcohol as both an accelerating and orienting agent. Since the alcohol is not appreciably converted by the action of the alkaline sulphide, it may be recovered at the close of the operation of forming the organic sulphide complex and may be reused.

In some cases I may take the alcohol-containing spent liquor from the reaction and fortify it with additional sulphur and/or sodium hydroxide, as the case may be, and use it again to bring about the conversion of additional quantities of the aldehyde mixture.

One application of the present invention is in forming resins or plastic bodies from the products of oxidation of petroleum. When petroleum hydrocarbons are oxidized in vapor phase by passing over a catalyst in the presence of air while proper conditions of temperature regulation and the like are maintained, a mixture of aldehydes and alcohols can be obtained which is well suited for treatment with a sulphiding agent. Natural gas and also gases from petroleum stills, including cracking stills, may be submitted to partial oxidation to make intermediate products, including mixed aldehydes and alcohols, thereby securing an alcoholic medium well suited for conduct of the reaction and at the same time yielding a mixture of two or more aldehydes which on being converted into sulphured products are particularly amorphous owing to their complexity. In like manner aldehydes obtained by oxidation of heavy oils by air blowing under high pressure may be converted into plastic resinous bodies by the sulphide treatment. The invention, therefore, includes the process of making a plastic containing sulphur in combination comprising reacting on the mixed aldehydes of petroleum oxidation with an alkaline polysulphide, preferably in the presence of an alcohol which preferably is one formed by said oxidation process and the products of such sulphide treatment, including alkali-polysulphide-resinified products of petroleum hydrocarbon oxidation, including the gases from petroleum as well as the liquid products thereof.

Reaction may take place at atmospheric pressure or in some cases pressure vessels may be used to allow of operation at super-atmospheric pressures. Some of the higher aldehydes not readily volatile may be treated at pressures below atmospheric if desired.

The cheapest form of polysulphide is that made from calcium oxide or hydroxide and sulphur, but calcium polysulphide may leave in the composition some residues of calcium which may not be suitable for the purpose intended and therefore sodium polysulphide is recommended for general purposes. It may be made from sulphur and sodium hydroxide, carbonate, and the like, either by wet or dry methods. Potassium polysulphide is more costly and ammonium polysulphide is not as suitable in many cases, but the use of these sulphiding agents is not precluded.

When it is desirable to separate acetaldehyde from formaldehyde in the form of resinous bodies, the mixture of the two aldehydes may be treated first with a small proportion of caustic soda to resinify the acetaldehyde or convert it to a non-volatile form (aldol, etc.) and separate such products of alkali conversion, then add sodium polysulphide and convert the formaldehyde to methylene sulphide or kindred olefin sulphide. Finally alcohol, if present, is then recovered. This procedure may be applied to the products of oxidation of natural gas containing formaldehyde, acetaldehyde, methyl alcohol, a small proportion of ethyl alcohol, water and certain substances in small proportion which polymerize very readily. Formaldehyde from this source is rather difficult to purify from the traces of higher aldehydes present and the treatment with the alkaline polysulphide converts the aldehydic content into plastic bodies, the amorphous character of which will be influenced by any higher aldehydes present. As an illustration of an aldehydic raw material mixture obtained from the oxidation of the hydrocarbons of natural gas the following is perhaps typical of one rich is aldehydes; namely, 45 per cent formaldehyde, 12 to 15 per cent of acetaldehyde, 30 to 35 per cent of methyl alcohol, together with water approximately 10 per cent, ethyl alcohol one-half per cent: higher aldehydes and polymerizable bodies also present.

Still another procedure is that of reacting on a mixture of symmetrical ethylene dichloride and formaldehyde with alkaline polysulphide or similar sulphiding agent. The proportions of the aldehyde to the dichloride may be varied over a considerable range, say from one part of formaldehyde to 10 parts of ethylene dichloride on the one hand, and 10 parts of formaldehyde to one part of ethylene dichloride on the other hand. Acetaldehyde may be used in place of the formaldehyde in whole or in part.

From the foregoing it will be evident that the process thus may be employed to separate alcohols from aldehydes, converting the latter into non-volatile products by a sulphiding reaction and separating the alcohol therefrom.

The following illustrate various phases of the invention, the proportions being given in parts by weight:

1. Sodium hydroxide 60, sulphur 96, water 100, methanol 50, acetaldehyde 25, formaldehyde 100. The sodium hydroxide and sulphur were heated under reflux condenser with the amount of water stated, forming the polysulphide, methanol and the aldehydes then added. Reaction took place forming a yellowish gummy mass soft to the touch but not sticky, resembling taffy in the manner in which it can be "pulled". The washed and dried product is substantially transparent and when drawn into strings shows a slight measure of elasticity or tendency to contract.

If formaldehyde is treated in the absence of acetaldehyde under like conditions a much harder product results.

2. Sodium hydroxide 40, sulphur 96, water 150, acetaldehyde 88, but without formaldehyde, were reacted together yielding a soft gummy resin of brown color. This was washed on sheeting rolls and dried by heating to 120°. An opaque soft non-sticky resinous mass resulted. A formaldehyde sulphide solid was made by reacting sodium hydroxide 30, sulphur 50, water 100, methanol 50 and formaldehyde 100. The reaction was started by heating and the source of heat withdrawn and reaction allowed to progress spontaneously. A hard mass was obtained which softens in hot water and then can be washed in cooler water. This formaldehyde sulphide was incorporated with the acetaldehyde resin obtained as noted, using proportions of equal parts, 3 parts of formaldehyde sulphide to 1 part of the acetaldehyde product, and 10 parts of the formaldehyde sulphide to 1 part of said acetaldehyde product. While the resulting resins did not appear to have quite the same properties as those evidenced when the two aldehydes were reacted together, nevertheless the softening or fluxing action of the acetaldehyde resin was manifest. The product made with equal parts was soft and easily indented with the finger nail but was more opaque than the product made by coreaction of the two aldehydes. The compositions prepared with higher proportions of the formaldehyde sulphide were harder in proportion to the amount of the formaldehyde sulphide present.

3. The resinous composition described under Example 1 was incorporated with crepe rubber and on heating hardening resulted. The proportions used were crepe rubber 4 and acetaldehyde formaldehyde sulphur resin 1. Prior to the heating the composition gave a soft rubbery elastic mass.

4. Sodium hydroxide 60, sulphur 96, water 100, methanol 50, symmetrical ethylene dichloride 25, formaldehyde 75.

The sodium hydroxide was dissolved in water, sulphur added and the solution heated under a reflux condenser until the sulphur had dissolved, the solution of sodium polysulphide which resulted being then cooled and methanol added together with the ethylene dichloride and formaldehyde. The mixture was heated for several hours on the water bath to 80° C. and then allowed to cool gradually by standing over night. A soft resinous plastic results which pulls like taffy when washed under cold water. Product has strong coherence and may be drawn into threads or sheets by mere extension of a mass of the material.

5. Mixed aldehydes of petroleum origin. A mixture obtained by air-oxidation of natural gas was used containing approximately 27 per cent formaldehyde, 3 per cent acetaldehyde, and a considerable proportion of methanol, together with small quantities of higher aldehydes and acrid bodies.

Sodium hydoxide 40, sulphur 96, water 150, the above aldehydic mixture 170. The caustic soda, sulphur and water were heated to form the polysulphide and the aldehydic mixture added. Heat was applied until bubbles commenced to be evolved, when the heat was removed and reapplied at fifteen minute intervals, each time sufficient to bring just to the bubbling point, this being continued for 4 hours. The reaction mixture was then allowed to stand over night and on examination of the cold solution it was found that a heavy, soft, plastic, coherent precipitate had formed constituting a yellowish emulsion. When heated to expel water there was obtained a clear, soft, brownish resin.

In using the mixed aldehydes as above the precipitate of plastic material is not always obtained, as will be illustrated by the following:

6. Sodium hydroxide 60, sulphur 96, water 150, mixed aldehydes as in Example 5, 150. Heated on water bath at 80-90° C. for 6 hours did not give any precipitate. The presence of some bodies in this crude aldehydic mixture evidently influences or hinders the formation of the plastic sulphide.

What I claim is:

1. The process of making a plastic containing sulphur in combination which comprises reacting on a mixture of formaldehyde and acetaldehyde with an alkaline polysulphide.

2. The process of making a plastic containing sulphur in combination which comprises reacting on a mixture of formaldehyde and acetaldehyde with an alkaline polysulphide in the presence of a lower aliphatic alcohol.

3. The process of making a plastic containing sulphur in combination which comprises reacting on a mixture of formaldehyde and acetaldehyde with an alkaline polysulphide in the presence of methanol.

4. The process of making a plastic containing sulphur in combination which comprises reacting on formaldehyde and a higher aldehyde with alkaline polysulphide.

5. The process of making a plastic containing sulphur in combination which comprises reacting on a mixture of aldehydes with alkaline polysulphide.

6. The process of making a plastic containing sulphur in combination which comprises reacting on the mixed aldehydes of petroleum oxidation with an alkaline polysulphide.

7. The process of making a plastic containing sulphur in combination which comprises reacting on the mixed aldehydes of petroleum oxidation with an alkaline polysulphide in the presence of an alcohol.

8. The process of separating alcohols from aldehydes in the composite product of petroleum oxidation which comprises reacting upon said composite product with alkaline polysulphide to convert the aldehydes into non-volatile products and separating the alcohol therefrom.

9. As a plastic, the co-reacted sulphur-containing reaction products of alkaline polysulphide on a mixture of formaldehyde and acetaldehyde.

10. Alkali-polysulphide-resinified products of petroleum oxidation products containing a plurality of aldehydes.

CARLETON ELLIS.